United States Patent [19]

Noji et al.

[11] 4,172,912

[45] Oct. 30, 1979

[54] PROCESS FOR ADHERING POLYETHYLENE TO STEEL SUBSTRATES

[75] Inventors: Kohji Noji, Minoo; Tetsuzo Arai, Takarazuka; Yasuhiko Okamoto, Sennan; Kunioki Kato, Akashi; Miyoshi Koyama; Koichi Fujiki, both of Kakogawa, all of Japan

[73] Assignees: Sumitomo Metal Industries Limited, Osaka; Seitetsu Kagaku Co., Ltd., Hyogo, both of Japan

[21] Appl. No.: 843,849

[22] Filed: Oct. 20, 1977

Related U.S. Application Data

[60] Continuation of Ser. No. 604,784, Aug. 14, 1975, abandoned, which is a division of Ser. No. 479,579, Jun. 14, 1974, abandoned.

[30] Foreign Application Priority Data

Jun. 15, 1973 [JP] Japan .................................. 48-67553

[51] Int. Cl.$^2$ ........................... B05D 3/02; B32B 15/08
[52] U.S. Cl. .................................... 427/375; 427/230; 427/388 A; 427/409; 428/36; 428/461; 428/463
[58] Field of Search ............... 427/318, 327, 388, 409, 427/375, 230; 428/36, 344, 354, 355, 461, 463, 520, 523; 260/79.3

[56] References Cited

U.S. PATENT DOCUMENTS

| | | | |
|---|---|---|---|
| 2,630,398 | 3/1953 | Brooks et al. | 260/79.3 |
| 2,663,652 | 12/1953 | Railing | 427/388 |
| 2,757,155 | 7/1956 | Sudekum | 260/30.4 |
| 3,049,455 | 8/1962 | Werkin et al. | 428/463 |
| 3,051,666 | 8/1962 | Snoddon | 260/79.3 |
| 3,348,995 | 10/1967 | Baker et al. | 428/461 X |
| 3,415,715 | 12/1968 | Van Gorcom | 428/461 X |
| 3,547,682 | 12/1970 | Erb | 427/409 |
| 3,592,728 | 7/1971 | Muise | 428/461 X |

FOREIGN PATENT DOCUMENTS

729596 3/1966 Canada.
790159 2/1958 United Kingdom.

Primary Examiner—P. E. Willis, Jr.
Attorney, Agent, or Firm—Watson, Cole, Grindle & Watson

[57] ABSTRACT

A coating composite containing sulfochlorinated polyolefin having a sulfur content ranging from 0.2 to 2.5% by weight and a chlorine content ranging from 18 to 37% by weight is applied directly as an adhesive layer or is applied on one surface of a thermoplastic resin base to be contacted with a metal surface, which resin base is coated on the metal surface.

When the coating composite is pressed thereafter under a pressure, a coating on the metal surface with excellent adhesion, water and impact resistances is provided.

8 Claims, No Drawings

PROCESS FOR ADHERING POLYETHYLENE TO STEEL SUBSTRATES

This is a continuation, of application Ser. No. 604,784 filed Aug. 14, 1975 which was a division of Ser. No. 479,579 filed June 4, 1974, both abandoned.

This invention relates to a process for coating a layer on metals and coating composites employed for this process. More particularly, it relates to coating composites having extremely high adherence, water and impact resistances and coating materials based on thermoplastic resins having said coating compositions applied on one surface thereof as well as a process for forming said coating composites and the coating materials.

Adherence between a thermoplastic resin and a metal substrate has been studied in a wide range. However, when the coating is intended not only to have higher adherence between the thermoplastic resin and the metal substrate, but also to have a higher resistance against water and impact of the adhered layer, such an adhesive or a coating composite has not yet been developed.

For example, processes for coating a metal substrate include a process in which polyethylene powder is coated on a preheated metal substrate to an elevated temperature, followed by thermally treating the coated polyethylene so as to melt it completely. The coated layer obtained by such a process has initially high adherence but disadvantages in that it has poor resistance against water and the adherence reduces during the course of time.

Further, when adhesive resins such as E.V.A. (ethylene/vinyl acetate copolymers), E.E.A. (ethylene/ethyl acrylate copolymers) and the like are employed, the initial adherence is considerably high but has a disadvantage that the resistance against water is so poor that the total surface may be peeled off when the coated surface is scratched.

Still further, when a tackifier of hot melt type containing prodeminantly asphalt, rubber, oil and fats or the like is employed it has some disadvantages as follows: It is hardened and becomes brittle under the circumstances of the winter season. Since the tackifying property is reduced markedly, the adherence thereof with the coated layer and impact resistance are reduced. On the other hand, when exposed to an elevated temperature in the summer season, the tackifier is softened to result not only in reduction in the adhesion but also squeezing out from the end portions to reduce the adhesion and anticorrosive property.

Still further for the coating of metal, particularly for the anticorrosive coating of steel pipes, a process has conventionally been employed exclusively in which the steel pipes are coated by winding spirally jute, vinylon cloth, glass fiber cloth or the like impregnated with asphalt, coal tar, enamel or the like. Recently coating with extruded thermoplastic resin has been introduced and in order to improve the adherence thereof with steel pipes, a tackifier of asphalt base or an adhesive resin has been used between the thermoplastic resin and pipes.

Such coating with extruded resin is difficult technically or economically for the jointing portions of pipes, bends and tees or pipes having a large diameter.

Such coating has been generally effected by a conventional process in which asphalt, coal tar, enamel or the like is applied in molten state thereon or they are coated with a thermoplastic resin tape or a thermally contractible tube having a layer of an adhesive based on asphalt/rubber.

However as mentioned hereinabove, the tackifier has a number of disadvantages that it is hardened and becomes brittle at low temperatures in winter so that the tackifying property is reduced markedly to affect adversely on the adhesion and water-resisting property. On the other hand, when exposed at higher temperatures in summer, it is softened to reduce the adhesion, resulting in reduction of the adhesive power and anticorrosive property.

Moreover, it is inevitable that the adhesive layer is exposed directly under corrosive circumstances at the ends of wrapped tape, sleeves and the like so as to be deteriorated. Hence it is necessary to provide an adhesive layer having excellent functions as base material as a matter of course and having excellent functions of adhesion, water-resisting property and the like.

It is a primary object of this invention to provide coating composites comprising an adhesive layer which can be handled conveniently and have very high adherence and water-resisting property and impact resistance.

It is another object of this invention to provide coating materials having an adhesive layer on one surface of thermoplastic resin tape or thermally contractible tube and having high adhesion, water-resisting property and impact resistance.

It is still another object of this invention to provide a process forming such coating composites.

It is a further object of this invention to provide a process for forming such coating materials.

The coating composites of this invention comprise a sulfochlorinated polyolefin adhesive containing sulfur in an amount ranging from 0.2 to 2.5% by weight and chlorine in an amount ranging from 18 to 37% by weight.

The coating materials of this invention comprise said sulfochlorinated polyolefin as an adhesive and thermoplastic tape or thermally contractible tube as a base.

The term "sulfochlorinated polyolefins" as an adhesive layer as employed herein means those containing sulfur in an amount ranging from 0.2 to 2.5% by weight and chlorine in an amount ranging from 18 to 37% by weight and obtained by sulfochlorinating homopolymers or copolymers of ethylene, propylene, butadiene, isobutylene and the like or copolymers of an olefin such as styrene, vinyl chloride, vinyl acetate, acrylic acid or the like.

It is for the following reasons to restrict the sulfur in this invention. If the sulfur content is less than 0.2%, the desired adherence cannot be achieved easily and due to the lack in elastomeric resilence the adhesive will have poor impact resistance and thermal sensibility. If sulfur is included in an amount of more than 2.5%, the adherence with a metal will be improved but the thermal stability will be reduced.

If the chlorine content is less than 18%, the adherence will be poor and if it exceeds 37%, the adherence will be reduced again.

The sulfochlorinating can be effected, for example, by dispersing or dissolving appropriate polyolefin into a solvent and reacting it in the presence of sulfuryl chloride and chlorine gas or sulfur dioxide gas and chlorine gas and in the presence of a catalyst or under the irradiation of ultraviolet rays at an appropriate temperature.

In addition, when polyethylene having a density of less than 0.934% and a melt index ranging from 5 to 250 is used as a starting resin, the sulfochlorinated polyethylene having a chlorine content ranging from 20 to 35 by weight and a sulfur content ranging from 0.4 to 1.5% by weight gives particularly good results in the adherence, water-resisting property and impact resistance.

When another polyolefin, for example, ethylene/vinyl acetate copolymer is employed, good results can be obtained similarly by sulfochlorinating the copolymer having a density ranging from 0.92 to 0.98 and a melt index ranging from 0.6 to 60 so as to obtain the resulting sulfochlorinated copolymer having a chlorine content ranging from 18 to 37% by weight and a sulfur content ranging from 0.2 to 2.5% by weight.

Moreover, when polypropylene (P.P.) is used, good results in the adherence, water-resisting property and impact resistance can be obtained by sulfochlorinating the polymer having a density ranging from 0.85 to 0.95 and a melt index ranging from 3 to 300 so as to prepare the resulting sulfochlorinated polymer having a sulfur content ranging from 0.2 to 2.5% by weight and a chlorine content ranging from 18 to 37% by weight.

Thermoplastic resins as a base in this invention include polyethylene, polypropylene, polyamides, polyvinyl chloride, polystyrene, polyesters and copolymers thereof.

Better results can be obtained when the same type of resin is used as that used for the preparation of the adhesive as a base, but the resins are not always limited thereto.

Processes for laminating a thermoplastic resin base and a metal substrate by employing sulfochlorinated polyolefin in this invention include a process wherein a solution in which the sulfochlorinated polyolefin is dissolved in a solvent is applied on a metal substrate and after being dried, the thermoplastic resin base is coated by extruding it, a process in which the composite is coated on the substrate by powder coating or the like, a process in which an adhesive solution is applied on the surface of a thermoplastic resin film, sheet or the like and after being dried the applied surface is laminated with a preheated metal surface, a process in which sulfochlorinated polyolefin is formed into a film by extruding or the like and the film is interposed between the thermoplastic resin base film and the metal substrate and the like.

While an adhesive layer or coating layer may be formed on a metal substrate by a process as disclosed herein, coated metallic articles having high adherence, water-resisting property and impact resistance may be obtained through a single step by premixing a sulfochlorinated polyolefin and a thermoplastic resin and the premixed formulation is coated onto the substrate by extrusion or powder coating or the like.

The blending proportion of sulfochlorinated polyolefin to thermoplastic resin in such a coating material depends on the physical properties of the desired coating and the type of coating material, but in general, the thermoplastic resin is employed in an amount ranging from 10 to 300 parts by weight, preferably in an amount ranging from 50 to 250 parts by weight per 100 parts by weight of the sulfochlorinated polyolefin.

In the blending, when the thermoplastic resin is blended in an amount of less than 10 parts by weight per 100 parts by weight of sulfochlorinated polyolefin, the coated layer will give high adherence, water-resisting property and impact resistance, but will have a possibility not to obtain sufficient strength as a coating layer. On the contrary, when the blending proportion exceeds 300 parts by weight, the adherence and water-resisting property of the coated layer will be reduced.

As for preparing anti-corrosive tape according to this invention, molten sulfochlorinated polyolefin may be coated on a base, i.e., thermoplastic resin tape by extruding the former composition. Alternatively, a solution of sulfochlorinated polyolefin in an organic solvent may be coated and dried on the tape. Further, thermoplastic resin base and sulfochlorinated polyolefin may be extruded respectively and laminated integrally immediately after the extrusion.

Processes for preparing thermally contractible tubes include a process wherein a thermoplastic resin sheet provided with a thermally contractible property is laminated with sulfochlorinated polyolefin, and then the laminated sheet is formed into a tube having a desired diameter and a desired length, a process in which a tube is formed from thermoplastic resin provided with a thermally contractible property and sulfochlorinated polyolefin dissolved in an organic solvent is coated on the inner surface of said tube by brushing, spraying or the like and dried and other processes.

Processes for coating metal pipes by employing the anticorrosive pipe according to this invention include a process in which the metal pipe is wrapped spirally by a conventional wrapping procedure and the total coated surface is melted by means of a ring burner, torch lamp or other heating source. This process is effective in that upon heating, some of the sulfochlorinated polyolefin comprising the adhesive layer comes out from the end of the wrapped layer to be hardened at room temperature, thereby imparting the water-resisting property to the wrapped portions of the tape.

As for the heating system for curing, the abovementioned process illustrates a representative embodiment for repairing the joints of pipes at the sites of a piping operation. When a straight pipe or bend is coated by wrapping with the tape in a factory, the wrapped pipe or bend can be subjected to the heat and melting treatment by putting it into a heating oven or by high frequency induction heating.

When the thermally contractible tape is employed, it can be coated by the process for coating conventionally thermally contractible tube and employing commercially available tackifier of asphalt/rubber base without any modification. Alternatively, the portion to be coated of metal pipe is coated with a solution of sulfochlorinated polyolefin dissolved in an organic solvent and dried, which acts as a primer to achieve the desired object more effectively by integrating the adhesive layer on the tube upon heating and melting together.

Metals as employed in this invention include iron, copper, aluminium, tin, zinc and the like and alloys thereof. Articles having various shapes such as sheet, pipe, rod, wire and the like can be coated.

Solvents for the sulfochlorinated polyolefins as employed herein include one or more selected from the group comprising benzene, toluene, xylenes, chloroform, perchloroethylene, trichloroethylene, methyl ethyl ketone, methyl isobutyl ketone, ethyl acetate, monochlorobenzene and the like.

The sulfochlorinated polyolefins of this invention may be blended, if necessary, with an antioxidant, thermal stabilizer, cross-linking agent, plasticizer, colorant and the like. It may also be blended with other thermoplastic resins and derivatives thereof and reactive high molecular substances and the like.

When thermoplastic resin and metal are laminated together by interposing the sulfochlorinated polyolefin, a process for irradiating electron rays before or after the lamination may be applied.

Table 1 shows chlorine and sulfur contents of the adhesive layer of this invention as employed in the following examples and comparative examples.

Table 1

| No. of Sample | Type of base resin | Sulfochlorinated product | |
|---|---|---|---|
| | | Chlorine content % by weight | Sulfur content % by weight |
| S - 1 | PE | 30 | 1.0 |
| S - 2 | PE | 32 | 1.5 |
| S - 3 | PE | 30 | 1.1 |
| S - 4 | PE | 20 | 1.0 |
| S - 5 | PE | 35 | 1.1 |
| S - 6 | PE | 8 | 1.2 |
| S - 7 | PE | 65 | 1.5 |
| S - 8 | PE | 30 | 0.08 |
| S - 9 | PE | 35 | 6.5 |
| S - 10 | PP | 30 | 1.2 |
| S - 11 | E.V.A. | 31 | 1.1 |

EXAMPLES 1 TO 7

Steel plates having a length of 120 mm, a width of 25 mm and a thickness of 0.5 mm were polished with No. 80 emery paper, followed by degreasing with toluene. Each film of sulfochlorinated polyethylene, sulfochlorinated polypropylene and sulfochlorinated ethylene/vinyl acetate copolymer each having a length of 80 mm, a width of 25 mm and a thickness of 0.2 mm was then placed with said pretreated steel plate respectively, followed by piling correspondingly with polyethylene sheet, polypropylene sheet or ethylene/vinyl acetate copolymer sheet having a length of 120 mm, a width of 25 mm and a thickness of 1 mm correspondingly thereto.

The piled sheets were respectively pressed between a heating press at a temperature of 140° C. under a surface pressure of 1 kg/cm² for 5 minutes.

Table 2

| Examples and comparative examples | No. of sample of sulfochlorinated polyolefin | Type of polyolefin coating layer |
|---|---|---|
| Example 1 | S - 1 | PE |
| 2 | S - 2 | PE |
| 3 | S - 3 | PE |
| 4 | S - 4 | PE |
| 5 | S - 5 | PE |
| 6 | S - 10 | PP |
| 7 | S - 11 | E.V.A. |
| Comparative Example 1 | S - 6 | PE |
| 2 | S - 7 | PE |
| 3 | S - 8 | PE |
| 4* | S - 9 | PE |

| | | Water-resisting property | |
|---|---|---|---|
| No. of Example | Peel strength, kg/25mm | Peel strength after immersion in saline water | Peeled area after electrolysis test in saline soln. cm² |
| Example 1 | 14 | 14 | 1.2 |
| 2 | 18 | 16 | 2.0 |
| 3 | 12 | 12 | 1.4 |
| 4 | 8 | 8 | 1.8 |
| 5 | 5 | 5 | 1.2 |
| 6 | 7 | 7 | 1.7 |
| 7 | 9 | 8 | 1.3 |

Table 2-continued

| Comparative Example 1 | 4 | 0 | Total surface |
|---|---|---|---|
| 2 | 2 | 0 | Total surface |
| 3 | 4 | 2 | 16.5 |
| 4* | 12 | 12 | 1.6 |

*The sample has high adherence and water-resisting property but some foaming and discoloration were observed due to the thermal decomposition thereof upon the application by heating.
Note 1:
Adherence test: 180° Peeling test according to JIS K-6301
Note 2:
Immersion test in saline water: Immersion for a month in 5% saline water at 40° C.
Note 3:
Electrolysis test in saline water: The sample which had been scratched to a cut of 25 × 0.2mm through the film to the substrate was electrolyzed for 7 days at - 3V DC in 3% saline water.

As shown in Table 2, it has been found that the coated steel plates according to this invention have very high adherence and water-resisting property and no enlargement of the scratches was enhanced when the surface was scratched.

EXAMPLES 8 TO 13

Sulfochlorinated polyethylene was interposed in varied manner between steel plates pretreated in a manner similar to those disclosed in Examples 1 to 7 and several thermoplastic resins as a coating layer to be laminated.

In example 8, 20% solution of sulfochlorinated polyethylene of Sample S-1 in toluene was applied on a steel plate treated in a manner similar to the procedure as disclosed hereinbefore, dried at 100° C. for 10 minutes and then heated at 170° C. for 15 minutes. Then the precoated steel plate was immersed in a fluidal bed of powdered polyethylene of high pressure process to permit the powder to adhere on the surface. Immediately after the immersion, the plate was heated in an oven at 170° C. for 10 minutes to melt the adhered polyethylene powder, followed by cooling.

In example 9, the same sulfochlorinated polyethylene as in Example 8 was coated and dried in a manner similar to the procedure of Example 8 on a steel plate treated in a manner similar to the procedure of Example 8. A polyethylene sheet having a length of 120 mm, a width of 25 mm and a thickness of 1.0 mm was put on the precoated steel plate and pressed at a temperature of 140° C. under a surface pressure of 1 kg/cm² for 5 minutes.

In Examples 10 to 12, samples were prepared in accordance with the procedure disclosed in Examples 1 to 7 and as a coating layer, a sheet of Nylon-6, rigid polyvinyl chloride or polypropylene each having a length of 120 mm, a width of 25 mm and a thickness of 1 mm was employed respectively.

In Example 13, a sample was prepared in accordance with the procedure as disclosed in Example 9 and a polyester sheet was employed for the coating layer.

Table 3 shows the adherence and water-resisting property of these coated steel plates.

The measurements were effected in accordance with the procedures as disclosed in Examples 1 to 7.

Table 3

| | | | Water-resisting property | |
|---|---|---|---|---|
| No. of Example | No. of Sample of sulfochlorinated polyolefin | Peel strength, kg/25mm | Peel strength after immersion in saline | Peeled area after electrolysis test in saline, cm² |
| 8 | S - 1 | 10 | 10 | 1.3 |
| 9 | S - 1 | 13 | 13 | 1.2 |

Table 3-continued

| No. of Example | No. of Sample of sulfochlorinated polyolefin | Peel strength, kg/25mm | Water-resisting property | |
|---|---|---|---|---|
| | | | Peel strength after immersion in saline | Peeled area after electrolysis test in saline, cm² |
| 10 | S - 2 | 15 | 14 | 1.4 |
| 11 | S - 2 | 12 | 12 | 1.5 |
| 12 | S - 3 | 10 | 10 | 1.6 |
| 13 | S - 3 | 9 | 9 | 1.4 |

EXAMPLES 14 TO 17

Table 4 shows results of coated metal plates of copper, aluminum, zinc and tin in place of steel plate coated in a manner similar to the procedure as disclosed in Examples 1 to 4 employing sulfochlorinated polyethylene of Sample S - 1 of Table 1 as an adhesive layer.

The measurements were effected by the procedures according to Examples 1 to 7.

Table 4

| No. of Example | Type of metal | Peel strength, kg/25mm | Water-resisting property | |
|---|---|---|---|---|
| | | | Peel strength after immersion in saline | Peeled area after electrolysis test in saline, cm² |
| 14 | Copper | 14 | 14 | 1.4 |
| 15 | Aluminium | 14 | 14 | 1.2 |
| 16 | Zinc | 12 | 12 | 1.5 |
| 17 | Tin | 12 | 12 | 1.6 |

As shown in Table 4, the coated plates according to this invention are proved to have excellent high adherence and water-resisting property.

EXAMPLES 18 TO 20

In Example 18, the surface of a steel pipe (nominal: 80A) was coated with an intervening adhesive layer of sulfochlorinated polyethylene of Sample S - 2 as designated in Table 1 and an anticorrosive coating layer of polyethylene having a density of 0.930 by laminating these layers extruded concurrently through a common die from respective extruders. The thickness of the adhesive layer was 0.2 mm and that of the anticorrosive layer was 0.7 mm.

In Example 19, sulfochlorinated polyethylene of Sample S - 2 as designated in Table 1 is formed into film having a thickness of 0.1 mm, which was then wrapped on a steel pipe (nominal: 80A) and heated to 140° C. to be melted. Polyethylene having a density of 0.930 was coated thereon by the extrusion. The anticorrosive layer had a thickness of 0.7 mm.

In Example 20, sulfochlorinated polyethylene of Sample S - 2 as designated in Table 1 was dissolved in toluene to make up a 25% solution. The solution was coated onto a steel pipe (nominal: 80A) and dried at 140° C. for 10 minutes to form an adhesive layer of 0.05 mm. Immediately thereafter, the precoated pipe was further coated with polyethylene having a density of 0.935 as an anticorrosive layer by the extrusion.

Table 5 shows adherence, water-resisting property, impact resistance and environmental stress-cracking resistance of the anticorrosively coated steel pipe.

As comparative examples, additional steel pipes were doubly coated by using another adhesive resin and tackifier as an adhesive layer and such properties were compared.

Table 5

| Example and Comparative Example | Peel strength, kg/25mm at | | | |
|---|---|---|---|---|
| | 50° C. | 20° C. | 0° C. | −10° C. |
| Example 18 | 5.5 | 9.3 | 18.0 | 25.0< |
| 19 | | 10.5 | | |
| 20 | | 9.0 | | |
| Comparative Example* | | | | |
| 5 | 0.7 | 3.2 | 0.2> | 0 |
| 6 | | 18.0 | | |
| 7 | | 16.0 | | |

| Example and Comparative Example | Water-resisting property | | Impact resistance by Du Pont impact tester, no. of impact | Environmental stress-cracking resistance from appearance |
|---|---|---|---|---|
| | Immersion in tap water, intruded length, mm from the end | Peeled area after electrolysis test in saline water | | |
| Example 18 | 1.0> | 2.0 | 7–8 | Right |
| 19 | 1.0> | 2.5 | 7–8 | Right |
| 20 | 1.0> | 2.5 | 3–4 | Right |
| Comparative Example* | | | | |
| 5 | 4–5 | 6.0 | 3–4 | Right |
| 6 | Totally peeled | 30.5 | 3–4 | Cracking |
| 7 | 10–15 | 6.5 | — | |

*Comparative Example 5: As an adhesive layer, a tackifier of asphalt/rubber base was employed.
Comparative Example 6: As an adhesive layer, ethylene/ethyl acrylate copolymer was employed.
Comparative Example 7: Polyethylene powder was coated by the immersion process in the fluidal powder.
Length of pipe: 100mm (nominal 80A)

Note:
1. Adhesion: 180° Peeling test (the test being effected employing a strip having a width of 10mm and the results were calculated as 25mm width by multiplying by 2.5)
2. Immersion in tap water: Intruded length in mm from the immersed end 3 months after the immersion in tap water.
3. Electrolysis test in saline water: The test was effected in accordance with the procedure as disclosed in Examples 1 to 17 except electrolyzing for 14 days.
4. Impact resistance: Diameter of pendulum: ½", 1kg/35cm. The resistance was represented by the number of impacts until pin thereon, followed by heating to give a smooth coating layer.

As shown in Table 5, the anticorrosively coated steel pipe according to this invention has very excellent performance as compared with conventional ones in the adherence, water-resisting property, impact resistance and environmental stress-cracking resistance.

EXAMPLES 21 TO 26

In Examples 21 and 22, 100 parts by weight of the sulfochlorinated polyethylene of Sample S - 1 as designated in Table 1 was mixed with commercially available micropowdery polyethylene ("Flothene" UF 20 manufactured by Seitetsu Kagaku Co., Ltd.) in an amount of 300 and 200 parts by weight, respectively and the mixture was dissolved and dispersed in toluene to form sols.

The sols were coated onto steel plates pretreated as disclosed in Examples 1 to 7 with a brush, dried at 100° C. for 5 minutes and heated at 170° C. for 10 minutes to give smooth coating film.

In Examples 23 and 24, the sulfochlorinated polyethylene of Sample S - 1 as designated in Table 1 was mixed with polyethylene and the mixture was extruded at 140° C. using an extruder and the extrudate was cut into pellets by means of a pelletizer, which were pulverized into the powder in a mill. Steel plate pretreated as aforementioned was pretreated to 170° C. and immersed in the fluidized powder for about 10 seconds to stick the powder thereon, followed by heating to give a smooth coating layer.

In Examples 25 and 26, the compounded compositions prepared in Examples 23 and 24 were extruded from an extruder at 160° C. to coat a steel pipe (nominal: 80A) preheated at 140° C. through a die to give coated steel pipe.

Table 6 shows adherence and water-resisting property of the coated layers.

Table 6

| | Composition | | |
|---|---|---|---|
| Example | Sulfochlorinated polyethylene parts by weight | Polyethylene parts by weight | Procedure for coating |
| 21 | 100 | 300 | Immersion into sol |
| 22 | 100 | 200 | Immersion into sl |
| 23 | 100 | 100 | Immersion in fluidal powder |
| 24 | 100 | 50 | Immersion in fluidal powder |
| 25 | 100 | 100 | Coating by extrusion |
| 26 | 100 | 75 | Coating by extrusion |

| | | Water-resisting property | |
|---|---|---|---|
| Example | Peel strength, kg/25mm | Peel strength after immersion in saline for a month kg/25mm | Peeled area after electrolysis test in saline for 7 days cm² |
| 21 | Broken of film | Broken of film | 5.5 |
| 22 | Broken of film | Broken of film | 4.5 |
| 23 | 7 | 0 | 4.0 |
| 24 | 9 | 8 | 3.0 |
| 25 | 6 | 5 | 4.5 |
| 26 | 7 | 7 | 4.0 |

The testing procedures were in accordance with those in Examples 1 to 7, provided that the friction pull tests on Examples 25 and 26 were carried out for a strip having a width of 10 mm and the results were calculated correspondingly to a strip having a width of 25 mm by multiplying by 2.5 times.

As shown in Table 6, the coated steel sheets and steel pipes according to this invention had excellently high adherence and water-resisting property.

The following examples illustrate embodiments of the coating material, one surface of which having the adhesive layer as illustrated by the preceding examples.

EXAMPLES 27 TO 33

The sulfochlorinated polyethylene, sulfochlorinated polypropylene or sulfochlorinated ethylene/vinyl acetate copolymer as shown in Table 1 was used as an adhesive layer and coated by hot melting onto one surface of thermoplastic resin base tape by the extrusion. The resulting thermoplastic resin tape has the base having a film thickness of 0.25 mm and the adhesive layer having a film thickness of 0.15 mm and a width of 50 mm. The tape was coated onto a cleaned steel pipe of nominal 80A which had been degreased by washing with an alkaline solution and pickled with sulfuric acid to remove scale by wrapping spirally with an overlap of a half width. The coated steel pipe was heated by means of a torch lamp to hot melt it. Table 7 shows results of adherence and water-resisting property of the coated pipe.

Table 7

| (Pipe: nominal 80A, length: 200mm) | | | | | | |
|---|---|---|---|---|---|---|
| Example and Comparative Example | Sample No. of adhesive layer | Type of base resin tape | Peel strength, kg/10mm at | | | |
| | | | 0° C. | 25° C. | 50° C. | 70° C. |
| Example | | | | | | |
| 27 | S-1 | PE | 4.8 | 3.5 | 2.7 | 2.1 |
| 28 | S-2 | PE | 5.0 | 3.7 | 2.8 | 2.4 |
| 29 | S-3 | PE | 4.7 | 3.4 | 2.5 | 2.0 |
| 30 | S-4 | PE | 4.7 | 3.0 | 2.2 | 1.9 |
| 31 | S-5 | PE | 4.1 | 2.8 | 2.0 | 1.8 |
| 32 | S-6 | PP | 4.5 | 3.0 | 2.1 | 1.9 |
| 33 | S-7 | E.V.A. | 4.5 | 3.2 | 2.3 | 1.8 |
| Comparative Example | | | | | | |
| 8 | S-6 | PE | Peeled from PE | 2.0 | 1.1 | 1.0 |
| 9 | S-7 | PE | 3.8 | 1.2 | 0.7 | 0.5 |
| 10 | S-8 | PE | Peeled from PE | 1.4 | 1.0 | 0.8 |
| 11* | S-9 | PE | 4.8 | 3.0 | 2.4 | 2.0 |

| Example and comparative Example | Water-resisting property, peeled area after electrolysis test, longitudinal direction × peripheral direction, mm |
|---|---|
| Example | |
| 27 | 7 × 8 |
| 28 | 9 × 10 |
| 29 | 8 × 8 |
| 30 | 9 × 10 |
| 31 | 10 × 10 |
| 32 | 9 × 10 |
| 33 | 9 × 11 |
| Comparative Example | |
| 8 | Peeled off over the total periphery |
| 9 | Peeled off over the total periphery |
| 10 | 85 × 55 |
| 11* | 7 × 9 |

*The coated pipe has sufficient adherence and water-resisting property but when the adhesive layer was extruded and hot melted, thermal decomposition of resin tended to occur, resulting in the foaming and discoloration.
Note:
1. Adherence: 180° Peeling test along the longitudinal direction for the tape having a width of 10mm.
2. Electrolysis test in saline water: The film was scratched to the substrate in a circular form having a diameter of 3mm and the ends of the pipe were sealed to achieve the insulation. The pipe was immersed into 3% saline water and electrolyzed under -3V DC for 14 days.

As shown in Table 7, the anticorrosive tape of this invention on steel pipe has high adherence and water-resisting property in a wide temperature range and it is obvious that when the film is scratched, the enlargement of the damaged area is not enhanced.

EXAMPLE 34

Polyethylene layer in the area from the end to a distance of 50 mm was peeled off from two commercially available polyethylene-coated steel pipes having a nominal diameter of 150 mm and the two pipes were butt welded peripherally. The bare welded part of the integrated pipe and end parts of the polyethylene-coated layer to a distance of 100 mm from the ends were wrapped with the tape of Example 27 twice with an overlap of one-half of the width. Then the wrapped tape was heated uniformly and sufficiently by means of a ring burner and melted together to provide an anticorrosive coating of the joint.

Table 8 shows results obtained by measuring the adherence and water-resisting property of this coated part.

As comparative materials, welded joints of steel pipes prepared similarly were coated with commercially available tape with a tackifier of asphalt/rubber base (commercially available products A and B). The coating was effected by coating a required primer and wrapping twice with an overlap of one-half of the width in a manner similar to Example 34.

Table 8

(Pipe: Nominal 150A; length: 500mm)

| Tape tested | Peel strength, kg/10mm at | | | |
|---|---|---|---|---|
|  | 0° C. | 25° C. | 50° C. | 70° C. |
| Example 27 | 4.6 | 3.8 | 2.8 | 2.4 |
| Commercially available |  |  |  |  |
| Product A | 3.7 | 2.5 | 1.7 | 0.5 |
| Product B | Peeled from PE surface | 2.1 | 1.7 | 0.6 |

| Tape tested | Water-resisting property** | |
|---|---|---|
|  | Peeled area after electrolysis test in saline (1), mm | Intruded length, mm from the end after immersion test in tap water (2) |
| Example 27 | 8 × 8 | less than 1mm |
| Commercially available |  |  |
| Product A | 35 × 40 | 30mm, Floating of film |
| Product B | 40 × 48 | 45mm, Floating of film |

*The adherence was tested in accordance with the procedure as disclosed in Examples 27 to 33
**Water resisting test:
(1) Electrolysis test in saline water: Disclosed in Examples 27 to 33 (2) Immersion test in tap water: The central portion of the coating was cut with a razor blade to a length of 50mm along the longitudinal directon of the pipe to the substrate and the cut coating was immersed in water at 35° C. for 14 days and then the intruded peripheral distance of water from the cut was measured.

As shown in Table 8, the anticorrosive tape of this invention shows very high adhesion and water-resisting property as compared with commercially available anticorrosive tape of conventional type.

EXAMPLE 35

The tape made in accordance with Example 28 was helically wrapped with an overlap of a half width around a clean steel pipe (nominal: 80A and length: 5.5 m) descaled preliminarily by pickling with sulfuric acid. Then, thus wrapped steel pipe was passed at a velocity of 8 m/min. through a ring means heated with high frequency having the output of 10 KVA so as to complete the heat melting. The resultant steel pipe wrapped with PE tape shows very high adhesion and water-resisting property similarly to those of the coated pipe produced in accordance with Example 28.

EXAMPLE 36

The resin of Sample S - 3 as an adhesive layer and PE as a base were extruded concurrently through two extruders from both sides of the running direction. Immediately after the extrusion, the former resin was heat melted on one surface of the PE base to give an adhesive tape.

The resulting PE tape had a base thickness of 0.25 mm, an adhesive thickness of 0.16 mm and a width of 50 mm.

When the tape was coated on a steel pipe in a manner similar to the procedure as disclosed in Example 29, the adhesion test and water-resisting test show markedly good performance.

EXAMPLE 37

The resin of Sample S - 4 as an adhesive layer and PE as a base were extruded concurrently through two extruders from both sides of the running direction. Immediately after the extrusion, the former resin was hot melted on one surface of the base PE to give an adhesive tape.

The resulting PE tape had a base thickness of 0.25 mm, an adhesive thickness of 0.13 mm and a width of 50 mm.

A 20% solution of the resin of Sample S - 4 in toluene was applied with a brush on steel pipe (nominal: 80A) descaled preliminarily by pickling with sulfuric acid and air dried by standing at room temperature for 30 minutes. Thereafter, the tape prepared as disclosed in this example was wrapped spirally in a conventional manner, followed by hot melting by heating by means of a ring burner. When the coated pipe of this example was tested on the adherence and water-resisting property in a manner similar to the procedure as disclosed in Example 30, a very good performance was achieved in a manner similar to the results as shown in Example 30.

EXAMPLE 38

The adhesive resin of Sample S - 3 as employed in Example 29 was hot extruded to form a film having a thickness of 0.15 mm. The film was hot melted on a thermally contractible polyethylene sheet having a thickness of 1.0 mm. The composite polyethylene sheet was formed into a cylinder having a diameter of 200 mm and a length of 300 mm to form a contractible tube. The tube was covered on a welded joint prepared in a manner similar to the procedure as disclosed in Example 29 and allowed to contract thermally by means of a ring burner and hot melted to give an anticorrosive coating for the joint.

Table 9 shows results obtained by measuring the adherence and water-resisting property of the coating. As comparative materials, commercially available contractible polyethylene tube with an adhesive layer of asphalt/rubber base (commercially available products C and D) was coated on a welded joint of steel pipes prepared similarly. The testing procedure and conditions were in accordance with those in Example 34.

Table 9

(Pipe: nominal 150A; length: 500mm)

| Tube tested | Peel strength, kg/10mm at | | | |
|---|---|---|---|---|
|  | 0° C. | 25° C. | 50° C. | 70° C. |
| Example 38 | 4.4 | 3.5 | 3.0 | 2.3 |
| Commercially available |  |  |  |  |
| Product C | 2.1 | 1.7 | 1.2 | 0.5 |
| Product D | 1.9 | 1.1 | 0.8 | 0.4 |

| Tube tested | Water-resisting property | |
|---|---|---|
|  | Peeled after electrolysis test in saline (1) | Intruded length, mm from the end after immersion test in tap water (2) |
| Example 38 | 8 × 9 | 1.5mm |
| Commercially available |  |  |
| Product C | 23 × 24 | 5mm |
| Product D | 30 × 32 | 7mm |

As shown clearly in Table 9, the thermally contractible tube of this invention shows markedly improved adherence and water-resisting property as compared with conventional thermally contractible tube.

EXAMPLE 39 TO 41

The adhesive layer of Sample S - 5 as employed in Example 31 was hot extruded to form a sheet having a thickness of 0.15 mm. The sheet was hot melted on a thermally contractible polyethylene sheet having a thickness of 0.7 mm. The compsite sheet was then formed into a cylinder of thermally contractible tube having a diameter of 60 mm and a length of 250 mm.

The contractible tube was covered on metal pipes as specified in the following table and thermally contracted and melted by means of a torch lamp. In Example 39, a hot-galvanized steel pipe (nominal 40A), in Example 40, a copper pipe (nominal 40A) and in Example 41, an aluminum pipe (nominal 40A) were employed.

Table 10 shows results of adherence and water-resisting property for these coated metal pipes.

The testing procedures and conditions were employed in accordance with those disclosed in Example 34.

Table 10

(Pipe: nominal 40A, length: 250mm)

| Example | Type of pipe | Peel strength kg/10mm, at | | | |
|---|---|---|---|---|---|
| | | 0° C. | 25° C. | 50° C. | 70° C. |
| 39 | hot-galvanized steel pipe | 3.9 | 3.0 | 2.7 | 2.1 |
| 40 | copper pipe | 4.1 | 3.8 | 3.1 | 2.4 |
| 41 | aluminum pipe | 4.0 | 3.8 | 3.0 | 2.5 |

| Example | Water-resisting property | |
|---|---|---|
| | Peeled after electrolysis test in saline (1) | Intruded length, mm from the end after immersion test in tap water (2) |
| 39 | 10 × 9 | 2mm |
| 40 | 7 × 8 | 1.5mm |
| 41 | 9 × 8 | 1.5mm |

As shown obviously in Table 10, the thermally contractible tube of this invention has also excellent adherence and water-resisting property for non ferrous metals as for steel.

As referred to hereinabove, this invention provides adhesive compositions between a thermoplastic resin and a metal and for a coating composite on a metal which can adhere well by a simple treatment both to the thermoplastic resin and metal and the adhesive layer of which has very excellent adherence, water-resisting property and impact resistance. In addition, the coating process on metals according to this invention can be easily applicable irrespective of operation conditions in the factory and sites and the procedure is very convenient. Moreover, the coating material employed in this process has high adherence and water-resisting property over a wide temperature range and the coating is conducted effectively.

What we claim are as follows:

1. A process for coating steel comprising the steps of interposing an intermediate adhesive layer having an excellent water resisting property between the surface of a steel and a coating of polyethylene, said layer consisting essentially of sulfochlorinated polyethylene having a chlorine content ranging from 20 to 35% by weight and a sulfur content ranging from 0.4 to 1.5% by weight, the sulfochlorinated polyethylene formed from polyethylene having a density less than 0.934 and a melt index ranging from 5 to 250, and adhering said layer to said steel and polyethylene by heating.

2. A process according to claim 1 wherein the sulfochlorinated polyethylene and polyethylene are heated and extruded in the molten state respectively so as to coat the steel.

3. A process according to claim 1 wherein the sulfochlorinated polyethylene dissolved in a solvent is applied and dried on the steel surface and then a polyethylene base material is coated thereon.

4. A process according to claim 1 wherein powdered sulfochlorinated polyethylene is adhered to the steel surface and heated to be molten so as to cover said surface and then a polyethylene base material is coated thereon.

5. A process according to claim 1 wherein the polyethylene is a thermally contractible tube, the inner surface of which is provided with the layer of sulfochlorinated polyethylene, the portion to be coated is a steel pipe which is coated in advance with sulfochlorinated polyethylene and said thermally contractible tube is set onto said portion of the steel pipe and is followed by hot-melting.

6. The process according to claim 1 wherein said intermediate adhesive layer is applied on one surface of a polyethylene base material and then said base material is coated and hot melted onto the surface of the steel.

7. The process according to claim 6 wherein said polyethylene base material is in the form of a tape and is wrapped around the steel surface and heated so as to allow a part of sulfochlorinated polyethylene to come out from the wrapped ends, thereby adhering to the steel surface.

8. A process for coating steel comprising the steps of premixing sulfochlorinated polyolefin having a chlorine content ranging from 20 to 35% by weight and a sulfur content ranging from 0.4 to 1.5% by weight, the sulfochlorinated polyethylene formed from polyethylene having a density less than 0.934 and a melt index ranging from 5 to 250, with polyethylene in the proportion of 10 to 300 parts by weight of the latter per 100 parts by weight of the former and disposing said premixture on a steel surface to be hot-melted thereon.

* * * * *